3,577,389
CHAR RESISTANT POLYURETHANE

George A. Kuhar, Greensburg, Ohio, assignor to The Goodyear Tire & Rubber Company, Akron, Ohio
No Drawing. Filed Aug. 19, 1968, Ser. No. 753,756
Int. Cl. C08g 22/06, 22/12
U.S. Cl. 260—75      5 Claims

ABSTRACT OF THE DISCLOSURE

A polyurethane composition prepared by reacting o-tolidine diisocyanate, dicumyl peroxide and an unsaturated polyester diol of the structure obtained by the condensation of adipic acid and a mixture of ethylene glycol and glycerol α-allyl ether where the said composition has a Shore A hardness of from about 25 to about 45 and an arc image char rate of from about 1.5 to about 3 mils/second.

---

This invention relates to improved polyurethane type of compositions and to a method for their preparation.

Heretofore cured polyurethane type of compositions at high temperatures typically easily char and erode even in a nitrogen atmosphere or they melt before charring and eroding occur. Cured polyurethane type of compositions have been loaded or filled with various fillers in an effort to minimize this deficiency and to increase their resistance to char and erosion at relatively high temperatures. However, their usefulness is limited since they have an excessive hardness to be suitable for purposes requiring relatively soft materials such as, for example, the encapsulation of close fitting movable joints. Close fitting joints encapsulated with such cured polyurethanes are actuated with excessive difficulty because of the hardness of the polyurethane type composition.

Therefore, it is an object of this invention to provide a castable polyurethane type of composition that when cured is normally soft and is char and erosion resistant at high temperatures.

In accordance with this invention it has been found that an improved polyurethane type of composition comprises the reaction product of (A) 100 parts by weight of an unsaturated polyester diol of the structure obtained by the condensation of adipic acid and a mixture of from about 65 to about 75 weight percent ethylene glycol and correspondingly from about 35 to about 25 weight percent glycerol α-allylether, the said unsaturated polyester diol having a molecular weight of from about 2000 to about 2500, an hydroxyl number of from about 45 to about 60 and an acid number of less than about 0.5, (B) o-tolidine diisocyanate, where the ratio of the isocyanato groups of the diisocyanate to the hydroxyl groups of the polyester diol is from about 0.9 to about 1.1, and (C) from about 0.5 to about 1.0 part by weight of dicumyl peroxide. The polyester diol, because of the glycerol α-allyl ether, has pendant unsaturation.

Cured unfilled polyurethane type compositions of this invention are characterized by having a Shore A hardness of from about 25 to about 45 and preferably from about 30 to about 40. They are further characterized, when colored black such as by mixing with a small amount of fine particulate carbon black, by having an arc image char rate of from about 1.5 to about 3 and preferably from about 2 to about 2.5 mils/second. The arc image char rate is the rate of erosion of the square surface of a 1″ x 1″ sample having a thickness of about ⅜″, measured in mils per second when the square surface is exposed in a nitrogen atmosphere to a heat flex of about 150 calories per square centimeter per second for 30 seconds caused by an electrical arc image focused on the square surface of the sample. The electrical arc image can be focussed by techniques well known to those skilled in the arc imaging art such as by reflective focussing with curved mirrors. The sample is colored black with a small amount of carbon black to facilitate the absorption of radiant energy from the arc imaging furnace. Usually only a small amount is needed to color the sample black, such as from about 1 to about 2 parts by weight of a powdery acetylene carbon black per 100 parts of the polyurethane type of composition.

In the practice of this invention the cured polyurethane type composition can be prepared by mixing the polyester diol, the diisocyanate and the peroxide and reacting, or curing, the said mixture at various temperatures such as from about 20° C. to about 100° C. or higher for correspondingly various times such as from about 10 to about 50 hours. If desired, the composition can be prepared stepwise by adding the peroxide to a mixture of the polyester and the diisocyanate, adding the polyester to a mixture of the diisocyanate and the peroxide, or adding the diisocyanate to a mixture of the polyester and the peroxide. If the stepwise method is used then the additive should be added to the mixture soon after the initial mixture is formed, preferably before the mixture sets up, such as from about 5 to about 20 minutes.

The mixture is castable before it sets up and therefore, if desired, the mixture can be cast onto a substrate and cured in situ. For example, the composition of this invention is very useful for the encapsulation of close fitting movable steel joints, such as ball and socket joints, which are exposed to elevated temperatures for relatively short periods of time such as 1000° C. or more for several minutes. The joint can easily be encapsulated by casting the mixture onto the steel and curing it in situ to form a composite structure.

The invention is further illustrated by the following example in which the parts and percentages are by weight unless otherwise indicated.

EXAMPLE I

To two suitable reactors were charged 100 parts of an unsaturated polyester diol having an hydroxyl number of 50.3, an acid number of less than .5 and a molecular weight of about 2230 of the structure obtained by condensation of adipic acid with a mixture consisting of 70 weight percent ethylene glycol and 30 weight percent glycerol α-allyl ether (obtained as F15-4, #102, from The Witco Chemical Company). The polyester diol was degassed for about 40 minutes at about 80° C. Phenyl beta naphthylamine and carbon black were then added to the polyester diol and the resulting mixture degassed for about 20 minutes. The dicumyl peroxide was then added to the mixture and stirred for about 5 minutes. Melted o-tolidine diisocyanate was added and mixed for about 5 minutes. The amounts of reactants mixed in the two reactors is shown in Table 1. The resulting mixtures were cast onto a casting surface and cured for about 120 hours at about 24° C. to form sheets of cured polyurethane type compositions having a thickness of about ⅜″.

The cured polyurethane compositions were tested and found to have Shore A hardnesses of 37 and 38 and arc image erosion rates of 2.0 and 2.3 mils per second respectively as shown in Table 1.

TABLE 1

| Compounds | Parts by weight | |
| --- | --- | --- |
| | First reactor | Second reactor |
| Polyester diol | 100 | 100 |
| O-tolidine diisocyanate | 11.3 | 11.9 |
| Phenyl beta naphthylamine | 0.25 | 0.25 |
| Dicumyl peroxide | 1.0 | 0.5 |
| Acetylene carbon black | 1.3 | 1.3 |
| Shore A hardness of cured sample | 37 | 38 |
| Arc image erosion rate (mils/second) | 2.0 | 2.3 |

In this example, the small amount of phenyl beta naphthyl amine was added as an antioxidant to protect the double bonds in the unsaturated polyester diol from oxidation. The small amount of acetylene carbon black was added to color the samples black so that they would absorb heat more readily in the arc image char rate test.

The Shore A hardness was determined by standard ASTM Method No. 02240–64T. The arc image char rate was determined by the method described in Chapter 20 of "Thermal Imaging Techniques"[1]. This method consisted of focussing by mirrors the reflection of an electrical arc image with a maximum heat flux of about 150 calories per square centimeter-second on a 1″ x 1″ x 3/8″ sample which was gauged to the nearest 0.001 inch for 30 seconds. The arc image provided a heat source of about 2700° C. to about 3300° C. Loose char was removed by scraping and the sample regauged at room temperature. The arc image erosion rate was determined by exposing the sample to the heat flux in a nitrogen atmosphere. The depth of char removal was divided by 30 seconds and reported as the arc image erosion rate or char rate in mils/second. The terms "arc image erosion rate" and "arc image char rate" refer to the same phenomenon and are used interchangeably in this example and specification. Determination of the arc image erosion or char rate of this sample was made by M. T. Conger, one of the co-authors of Chapter 20 of "Thermal Imaging Techniques."

While certain representative embodiments and details have been shown for the purpose of illustrating the invention, it will be apparent to those skilled in this art that various changes and modifications may be made therein without departing from the spirit or scope of the invention.

What is claimed is:

1. A composition characterized by having a Shore A hardness of from about 25 to about 45 and an arc image char rate of from about 1.5 to about 3 mils/second where the arc image char rate is the rate of erosion of the square surface of a 1″ x 1″ black colored sample of the said composition having a thickness of about 3/8″ when the said square surface is exposed in a nitrogen atmosphere to a heat flux of about 150 calories per square centimeter for 30 seconds provided by a focused reflected electric arc heat source, where the said composition is prepared by reacting at a temperature of from about 20° C. to about 100° C. a mixture comprising
   (A) 100 parts by weight of an unsaturated polyester diol obtained by the condensation of adipic acid and a mixture of from about 65 to about 75 weight percent ethylene glycol and correspondingly from about 35 to about 25 weight percent glycerol α-allyl ether, the said unsaturated polyester diol having a molecular weight of from about 2000 to about 2500, an hydroxyl number of from about 45 to about 60 and an acid number of less than about 0.5,
   (B) o-tolidine diisocyanate, where the ratio of the isocyanato groups of the diisocyanate to the hydroxyl groups of the polyester diol is from about 0.9 to about 1.1 and
   (C) from about 0.5 to about 1.0 part by weight of dicumyl peroxide.

2. The composition of claim 1 wherein the said unsaturated polyester diol has pendant unsaturation, has a molecular weight of about 2200 to about 2300 and an hydroxyl number of about 50 to about 55 and is obtained by the condensation of adipic acid with a mixture of 70 weight percent ethylene glycol and correspondingly 30 weight percent glycerol α-allyl ether, and the said composition is characterized by having a Shore A hardness of from about 30 to about 40, an arc image char rate of from about 2 to about 2.5 mils/second.

3. A method of preparing the composition of claim 1 which comprises reacting at a temperature of about 20° C. to about 100° C. a mixture which comprises,
   (A) 100 parts by weight of an unsaturated polyester diol obtained by the condensation of adipic acid and a mixture of from about 65 to about 75 weight percent ethylene glycol and correspondingly from about 35 to about 25 weight percent glycerol α-allyl ether, the said unsaturated polyester diol having a molecular weight of from about 2000 to about 2500, an hydroxyl number of from about 45 to about 60 and an acid number of less than about 0.5,
   (B) o-tolidine diisocyanate, where the ratio of the isocyanato groups of the diisocyanate to the hydroxyl groups of the polyester diol is from about 0.9 to about 1.1 and
   (C) from about 0.5 to about 1.0 part by weight of dicumyl peroxide.

4. The composition of claim 2 where the said unsaturated polyester diol is obtained by the condensation of adipic acid with a mixture of about 70 weight percent ethylene glycol and correspondingly about 30 weight percent glycerol α-allyl ether.

5. The method according to claim 3 where the composition is characterized by having a Shore A hardness of from about 30 to about 40, an arc image char rate of from about 2 to about 2.5 mils/second, prepared by reacting the said mixture of polyester diol, diisocyanate and dicumyl peroxide at a temperature of about 24° C. wherein the said unsaturated polyester diol is obtained by the condensation of adipic acid and a mixture of about 70 weight percent ethylene glycol and correspondingly about 30 weight percent glycerol α-allyl ether.

References Cited

UNITED STATES PATENTS 3,043,807   7/1962   Snyder et al. _____ 260—75
3,130,175   4/1964   Peter et al. _____ 260—45.4

DONALD E. CZAJA, Primary Examiner

H. S. COCKERAM, Assistant Examiner

U.S. Cl. X.R.

260—77.5

---

[1] "Thermal imaging techniques" by Peter E. Glaser and Raymond F. Walker, published in 1964 by Plenum Press. (Chapter 20 entitled "Ablation and Analytical Measurements using an Arc Image Furnace" by Brownsword, Phillips and Conger.)